J. P. LAVIGNE.
HOSE COUPLING.
APPLICATION FILED MAR. 13, 1919.

1,349,284.

Patented Aug. 10, 1920.

Witness
Charles Balg
Karl H. Butler

Inventor
Joseph P. Lavigne
By
Attorneys

UNITED STATES PATENT OFFICE.

JOSEPH P. LAVIGNE, OF DETROIT, MICHIGAN, ASSIGNOR TO DETROIT MECHANICAL ENGINEERING COMPANY, OF DETROIT, MICHIGAN, A CORPORATION OF MICHIGAN.

HOSE-COUPLING.

1,349,284.

Specification of Letters Patent.

Patented Aug. 10, 1920.

Application filed March 13, 1919. Serial No. 282,347.

*To all whom it may concern:*

Be it known that I, JOSEPH P. LAVIGNE, a citizen of the United States of America, residing at Detroit, in the county of Wayne and State of Michigan, have invented certain new and useful Improvements in Hose-Couplings, of which the following is a specification, reference being had therein to the accompanying drawings.

This invention relates to a hose coupling and has special reference to a coupling that may be advantageously used for establishing communication between the radiator and the water jacket of an internal combustion engine, such structures forming part of an automobile or self propelled vehicle.

The primary object of my invention is to provide positive and reliable means, in a manner as hereinafter set forth, for connecting a flexible conduit, as a hose, to a rigid conduit as a metallic pipe or tube, so as to establish a non-leakable connection between the flexible and rigid conduits.

Another object of my invention is to provide novel sheet metal interlocking coupling members, one of which can be easily and quickly mounted on the end of a section of hose and firmly held thereby, while the other member is adapted for contracting the first mentioned member, so that the end of the hose will be frictionally clamped on the end of a pipe.

A further object of my invention is to provide a hose coupling wherein the parts are constructed with a view of reducing the cost of manufacture and at the same time retain those features by which durability, safety and ease of assembling are secured. With such ends in view my invention resides in the novel construction, combination and arrangement of parts to be hereinafter specifically described and then claimed.

Reference will now be had to the drawing, wherein—

Figure 2:
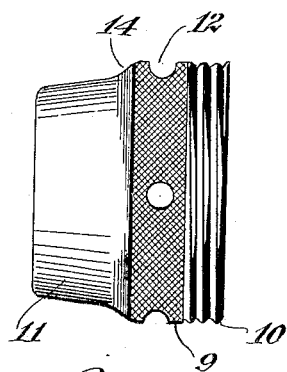
Fig. 2 is a side elevation of a detachable member.
Figure 3:
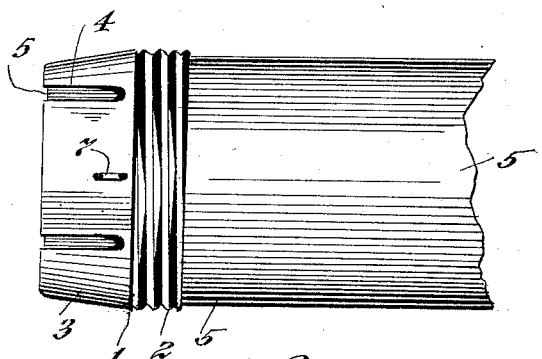
Fig. 3 is a similar view of a fixed member relatively to a section of hose.
Figure 1:
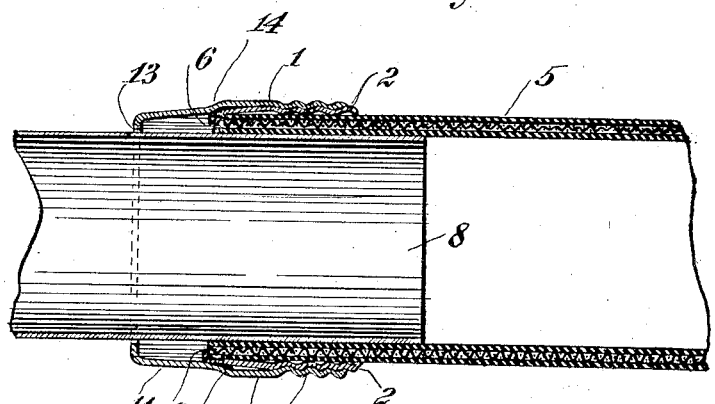
Figure 1 is a longitudinal sectional view of a hose coupling in accordance with my invention.
Figure 4:
Fig. 4 is a cross sectional view of a portion of the same illustrating the manner in which the fixed member is held against rotation on the end of a hose.

In the drawing, the reference numeral 1 denotes a fixed member that is formed of sheet metal and said member has an inner pressed screwthreaded portion 2 and an outer tapering nose portion 3. The nose portion of the member 3 has a plurality of longitudinal slots or slits 4, so that the nose portion 3 may be contracted about and on the end of a section of hose 5. To limit the fitting on movement of the member 1 on the hose 5, the nose portion 3 of said member has inturned edges or flanges 6, and to prevent rotation of said member on the hose 5, the nose portion 3 of said member, between the slots or slits 4, has longitudinal depressed portions providing inwardly projecting ribs 7. These ribs are adapted to engage in the walls of the hose 5 and prevent circumferential creeping of the member 1 on the hose 5, particularly when a detachable member is placed in engagement therewith.

The reference numeral 8 denotes the end of a rigid conduit, as a pipe on which the hose 5 is to be mounted and held to communicate therewith, but before placing the end of the hose on the pipe 8, a detachable member 9 is slipped on to the end of the pipe 8. This detachable member is somewhat in the form of a cap and has a threaded portion 10 and a tapering or nose portion 11. That portion of the detachable member between the ends thereof is knurled or roughened so as to be readily rotated by hand and has a plurality of openings or sockets 12 so that a spanner wrench or suitable tool may be employed for tightening the detachable member on the fixed member.

The tapering or nose portion 11 of the detachable member has an inturned annular flange 13 and this flange will maintain the inner end of the detachable member in spaced relation to the pipe 8, so that said detachable member can be easily shifted on to the fixed member and screwed thereon. As the detachable member is screwed upon the fixed member, the flared inner end portion 14 of the nose 11 engages the hose 3 of the fixed member, and contracts the same to such an extent that the hose 5 is frictionally crowded about the pipe 8 and the hose will be so crowded that the rubber or material of the hose will be clamped about the ribs 7 thereby positively holding the fixed member on the hose. With the detachable member having the flared portion 14 thereof at a greater angle than the angularity of the nose 3, the material between slots or slits 4 will be firmly compressed on to the hose, thus bringing the end of the hose into intimate contact with the pipe 8 so as to establish a non-leakable connection between said pipe and the hose.

I attach considerable importance to the fact that the detachable and fixed members can be pressed and stamped from sheet metal, finished to be non-corrodible, and quickly assembled for attaching a flexible conduit to a rigid conduit when the former can be fitted over the latter.

One embodiment of my invention has been illustrated, but it is to be understood that the structural elements are susceptible to such variations and modifications as fall within the scope of the appended claims.

What I claim is:—

1. The combination with a flexible conduit adapted to have a rigid conduit extend therein, of a sheet metal member fixed on the end of said flexible conduit, and provided with a contractible nose portion, and a sheet metal detachable member adapted to be mounted on said fixed member and having a flared portion adapted to contact with and contract the nose portion of said fixed member.

2. The combination with a hose and a pipe extending therein, of a fixed member on the end of said hose provided with a contractible nose portion, and a detachable member adapted to be screwed on to said fixed member and having a portion to engage the nose portion of said fixed member and press said nose portion on said hose so that said hose establishes a non-leakable connection with said pipe.

3. The combination with a hose and a pipe extending therein, of a fixed member on said hose having a contractible nose portion, a detachable member screwed on said fixed member and adapted for contracting the nose portion thereof so as to clamp said hose on said pipe, and inwardly projecting ribs carried by the nose portion of said fixed member adapted to prevent rotation of said fixed member relatively to said hose.

4. The combination with a hose and a pipe extending therein, of a sheet metal member fixed on the end of said hose and having a threaded portion and a slotted nose portion, the nose portion of said fixed member being provided with inwardly projecting ribs adapted to engage in the hose and prevent rotation of said fixed member relative thereto, and a detachable member adapted to be screwed on said fixed member, said detachable member having a nose and flared portions adapted for engagement with the nose portion of said fixed member so as to contract said nose portion about the end of the hose and cause said hose to frictionally clamp said pipe.

In witness whereof I affix my signature in the presence of two witnesses.

JOSEPH P. LAVIGNE.

Witnesses:
LEWIS E. FLANDERS,
G. E. McGRANN.